(12) United States Patent
Frank

(10) Patent No.: US 7,498,374 B2
(45) Date of Patent: Mar. 3, 2009

(54) CAST POLYMER AND METHOD OF MAKING THE SAME

(76) Inventor: Irwin Frank, 398 Creek Dr., Benton, WI (US) 53803

( * ) Notice: Subject to any disclaimer, the term of this patent is extended or adjusted under 35 U.S.C. 154(b) by 300 days.

(21) Appl. No.: 11/560,116

(22) Filed: Nov. 15, 2006

(65) Prior Publication Data

US 2008/0161447 A1    Jul. 3, 2008

(51) Int. Cl.
  *C08K 3/30*    (2006.01)
  *C08K 3/34*    (2006.01)
  *C08K 3/08*    (2006.01)
(52) U.S. Cl. .................. 524/423; 524/492; 524/493; 524/494; 524/433; 523/440; 523/442
(58) Field of Classification Search ............ 524/401, 524/423, 556, 601, 492, 493, 494, 433
See application file for complete search history.

(56) References Cited

U.S. PATENT DOCUMENTS

| | | | |
|---|---|---|---|
| 4,375,489 A | 3/1983 | Muszynski | |
| 4,545,886 A | 10/1985 | de Nora et al. | |
| 4,911,326 A | 3/1990 | McGouran, Jr. | |
| 5,075,065 A | 12/1991 | Effenberger et al. | |
| 5,118,540 A | 6/1992 | Hutchison | |
| 5,418,265 A * | 5/1995 | Matsuzaki et al. | 523/440 |
| 5,441,772 A | 8/1995 | McAndrew et al. | |
| 5,866,273 A | 2/1999 | Wiggins et al. | |
| 6,034,155 A | 3/2000 | Espeland et al. | |
| 6,048,593 A | 4/2000 | Espeland et al. | |
| 2004/0102556 A1 * | 5/2004 | Frank | 524/401 |

* cited by examiner

*Primary Examiner*—Marc S Zimmer
*Assistant Examiner*—John Uselding
(74) *Attorney, Agent, or Firm*—Joseph T. Leone, Esq.; DeWitt Ross & Stevens S.C.

(57) ABSTRACT

Disclosed is a composite material including from about 50 wt % to about 75 wt % (based on the total weight of the composite material) of inorganic material, wherein the inorganic material includes from about 30 wt % to about 50 wt % (based on weight of the inorganic material) of a first inorganic filler having an average particle size ranging from about 0.5 mm to about 5 mm; and from about 50 wt % to about 70 wt % (based on weight of the inorganic filler) of a second inorganic filler having an average particle size ranging from 0.02 mm to about 0.1 mm; and from about 25 wt % to about 50 wt % (based on total weight of the composite material) of a thermosetting polymeric resin.

22 Claims, No Drawings

US 7,498,374 B2

CAST POLYMER AND METHOD OF MAKING THE SAME

CROSS-REFERENCE TO RELATED APPLICATIONS

Priority is hereby claimed to co-pending application Ser. No. 10/704,009, filed Nov. 7, 2003, which claims priority to provisional application Ser. No. 60/425,828, filed Nov. 14, 2002, the entire contents of both which are incorporated herein by reference.

FIELD OF THE INVENTION

The invention is directed to a cast polymer composition of matter, method of making the composition, and articles of manufacture comprised of the composition.

BACKGROUND

Various polymer concrete compositions are known in the art. As used herein, the phrase "polymer concrete" generally refers to composite materials that contain a polymer matrix impregnated or co-mingled with inorganic particulates. Alternatively, an inorganic material, such as portland cement (hardened or fresh), can be co-mingled with a liquid monomeric compound, which is then polymerized in place to yield the final composition. If the cement portion of the composite is fresh, then the polymerization reaction and the concrete hardening reaction are usually performed simultaneously. Other composite materials referred to herein as a "polymer concrete" do not contain a cement component per se. Rather these types of materials are composites that include a polymer matrix and an inorganic filler that itself is not a "cement," but an aggregate (e.g., gravel, sand, and the like) or a fine inorganic powder (e.g., silica, talc, and the like). Both types of composite materials fall within the term "polymer cement" as used herein. Polymer cements also generally include some type of catalyst to speed the polymerization reaction that binds the inorganic materials and the polymeric materials into a cohesive whole.

See, for example, U.S. Pat. No. 6,048,593, issued Apr. 11, 2000, to Espeland et al. The Espeland et al. patent describes a castable polymer concrete composition that includes an unsaturated vinyl ester resin and an unsaturated polyester resin as the polymeric portion of the composite. Added to this polymer mix is about 10 to 40 wt % of a filler material having an average particle size of less than about 500 µm, and about 20 to 60 wt % of a filler material having an average particle size of from about 500 to 1,000 µm (the wt % being based on the total weight of the composition). The filler material is noted as including crystalline silica, amorphous silica, barium sulfate (baryte), mica, and glass or ceramic microspheres. See also U.S. Pat. No. 6,034,155, issued Mar. 7, 2000, to Espeland et al.

Polymer concrete compositions can be used in assorted fields, including in the fabrication of leak-proof storage containers. See, for example, U.S. Pat. No. 4,911,326, issued Mar. 27, 1990, to McGouran, Jr. In the McGouran patent, an underground storage tank includes an inner storage tank, that is surrounded by an outer containment shell fabricated from a polymer concrete. The primary purpose of the McGouran device is as an underground storage tank for gasoline. In the McGouran patent, the polymer concrete generally includes a polymer resin such as unsaturated polyester, epoxy, polystyrene, polymethyl methacrylate, and polyfuran resins. The inorganic filler used by McGouran is granite Polymer concrete composites can be remarkably durable. They can also have very desirable qualities, such as resistance to salts, acids, bases, and other corrosive materials. Thus, in additional to containment structures, polymer concrete materials are also used for fabricating pipes, tunnel support linings, bridge decks, counter-tops and sinks, corrosion-resistant electrolytic containers, and the like. See, for example, U.S. Pat. Nos. 4,545,886; 5,075,065; 5,118,540; and 5,441, 772.

A more complex type of composite material is described in U.S. Pat. No. 5,866,273, issued Feb. 2, 1999, to Wiggins et al. Here, the composite is formed of iron-silica complexes which have been processed to yield particulate material having a protective shell. These particles are then bound together with a polymeric matrix to yield a radar-absorbing composite material.

SUMMARY OF THE INVENTION

A first embodiment of the invention is directed to a composite material comprising from about 50 wt % to about 75 wt % (based on the total weight of the composite material) of inorganic material, wherein the inorganic material comprises from about 30 wt % to about 50 wt % (based on the weight of the inorganic material) of a first inorganic filler having an average particle size ranging from about 0.5 mm to about 5 mm, and from about 50 wt % to about 70 wt % (based on the weight of the inorganic filler) of a second inorganic filler having an average particle size ranging from 0.02 mm to about 0.1 mm, and from about 25 wt % to about 50 wt % (based on total weight of the composite material) of a thermosetting polymeric resin.

It is generally preferred that the first inorganic filler has an average particle size ranging from about 0.5 mm to about 3 mm, and the second inorganic filler has an average particle size ranging from about 0.03 mm to about 0.08 mm. It is still more preferred that the first inorganic filler has an average particle size ranging from about 0.6 mm to about 2.5 mm; and the second inorganic filler has an average particle size ranging from about 0.04 mm to about 0.075 mm.

The thermosetting polymeric resin preferably is selected from the group consisting of vinyl ester resins, unsaturated polyester resins, epoxy resins, and combinations thereof, with thermosetting vinyl ester resins being preferred.

The first and second inorganic fillers comprise a mineral. In the preferred versions of the invention, the first and second inorganic fillers independently comprise a mineral selected from the group consisting of magnesium sulfate, calcium sulfate, strontium sulfate, barium sulfate, and combinations thereof. The first and second inorganic fillers may also independently comprise a mineral selected from the group consisting of crystalline silica, amorphous silica, mica, glass, ceramics, magnesium sulfate, calcium sulfate, strontium sulfate, barium sulfate, and combinations thereof.

Another version of the invention comprises from about 60 wt % to about 75 wt % (based on total weight of the composite material) of inorganic material, and from about 25 wt % to about 40 wt % (based on total weight of the composite material) of a thermosetting polymeric resin. Yet another version of the invention comprises from about 65 wt % to about 72 wt % (based on the total weight of the composite material) of inorganic material, and from about 28 wt % to about 45 wt % (based on the total weight of the composite material) of a thermosetting polymeric resin.

In yet another version of the invention, the composite material comprises from about 40 wt % to about 60 wt % (based on total weight of the composite material) of inorganic material, wherein the inorganic material comprises from about 30 wt % to about 50 wt % (based on weight of the inorganic material) of a first inorganic filler having an average particle size ranging from about 0.5 mm to about 5 mm, and from about 50 wt % to about 70 wt % (based on weight of the inorganic filler) of a second inorganic filler having an average particle size ranging from 0.02 mm to about 0.1 mm; and from about 40 wt % to about 60 wt % (based on total weight of the composite material) of a thermosetting polymeric resin.

Another version of the invention is a composite material comprising a first inorganic filler having an average particle size ranging from about 0.5 mm to about 3 mm; and a second inorganic filler having an average particle size ranging from about 0.03 mm to about 0.08 mm, or more preferably still wherein the first inorganic filler has an average particle size ranging from about 0.6 mm to about 2.5 mm, and the second inorganic filler has an average particle size ranging from about 0.04 mm to about 0.075 mm.

Another version of the invention is dimensioned and configured specifically so that the composition can be applied as a pre-cured, spray up formulation, which is then cured after spray application. Here, the composite material comprises from about 40 wt % to about 60 wt % of an inorganic filler having an average particle size ranging from about 0.03 mm to about 0.08 mm; and from about 40 wt % to about 60 wt % of a thermosetting polymeric resin. Here, it is preferred that the composition comprises about 50 wt % of the inorganic filler; and wherein the second inorganic filler has an average particle size ranging from about 0.04 mm to about 0.075 mm. The inorganic fillers and the thermosetting resin are selected from those listed earlier.

While not being limited by any underlying phenomena, it is believed that the particle size distribution of the inorganic filler yields a finished product that is harder, stronger, and more corrosion and stain resistant than conventional polymer cement composite materials.

Additionally, when the larger particle sizes are used, the composition yields an unexpectedly durable product that simulates the look, feel, and heft of natural granite, at a fraction of the production cost. Unlike natural granite, however, the composition of the present invention is resistant to chemical spills and stains, and is not so easily chipped. And chips that do occur in the present composite material can be polished smooth using conventional fine-grit sandpaper. By way of a brief comparison, natural granite is often the counter top material of choice when money is no object. Natural granite is elegant, has a beautiful (if extremely limited) range of colors, holds up to heat well, and lends a permanent and substantial feel to kitchens. However, natural granite is very expensive, requires lots of maintenance (including periodic sealing), readily absorbs stains, cracks relatively easily, and is difficult (and often impossible) to repair even minor chips, and comes in a limited range of colors. In contrast, the resin component of the present composition is easily dyed, thereby allowing the composition to be fabricated in many hues— from the subtle shades to natural granite to gaudy and garish.

Another embodiment of the present invention is a method of making the composite material described earlier. The method comprises first mixing a polymerizable monomer that yields a thermoset polymer with the inorganic filler(s) to be used, in the ratios of the final desired product. The mixture is then agitated at a pressure less than atmospheric pressure (preferably about 20 torr or less for a period of about 5 minutes or more). A catalyst, such as methyl ethyl ketone peroxide (MEKP) is then added to the mixture to catalyze polymerization of the monomer. The mixture with the catalyst added is then stirred under reduced pressure.

The resulting composition is then shaped as desired (e.g., by molding or by spray applicator, in conventional fashion). When hard, the shaped article is then heated to a temperature of at least about 100° F. (37.8° C.) (and preferably at least 250° F. (121.1° C.)) to yield the finished product. The heating time will vary based on the mass and general shape of the article. Normally, about 2 hours of heating at 250° F. (121.1° C.) is ideal. The product may then be wet- or dry-sanded, milled, de-burred, or otherwise fine finished in conventional fashion.

It is preferred that the polymerizable monomer yields a thermoset polymeric resin selected from the group consisting of vinyl ester resins, unsaturated polyester resins, epoxy resins, and combinations thereof, with vinyl ester resin being preferred. The preferred inorganic fillers are those recited earlier. The steps that are taken at reduced pressure are preferably done at a pressure of about 20 torr or less (6,906 kg/m$^2$ or less; 0.67 atm or less).

A third embodiment of the invention are articles of manufacture made from the composite material described herein.

The composite material described herein is useful in any application where a stiff, strong, and chemically resistant surface is required. Thus, the composite material described herein is quite useful for making residential and industrial counter-tops, sinks, and other surfaces. The composite material can also be used for making decorative items where solid heft and a smooth finish are desirable. Thus, the material can be used to cast sculptures, game pieces, and functional items such as plates, serving dishes, ash trays, at the like. Once cured, the material of the present invention can be finished by conventional means such as wet-sanding to yield a finish that is highly polished and remarkably resistant to degradation by acids, bases, and high-temperatures. A distinct advantage of the present invention is that if a surface made using the subject material is damaged (e.g., by a scorch mark or other discoloration), it can be rejuvenated simply by sanding away the damaged portion.

DETAILED DESCRIPTION OF THE INVENTION

As noted in the Summary of the Invention, the composition of the present invention includes a polymeric resin. The preferred polymeric resins for use in the present invention are thermosetting vinyl ester resins. Such resins are readily available from numerous international commercial suppliers, including Dow Chemical Co. (Midland, Mich., USA), Superior Polymer Products (Calumet, Mich., USA), Fiber Glast Developments Corp. (Brookville, Ohio, USA), and Mechemco Industries (Mumbai, India). Unsaturated polyester resins and epoxy resins, which can also be used as the polymeric resin component of the present invention, can be obtained from these same (and many other) commercial suppliers. Vinyl esters are chemically similar to both unsaturated polyesters and epoxy resins. All three resins find extensive commercial use in fields such as the manufacture of automotive parts.

Vinyl ester resins are polymeric molecules wherein the individual monomers are linked to each other via ester bonds. Reactive vinyl groups are situated at the terminal ends of the polymer molecules, thus yielding the trivial generic name "vinyl esters." A typical example are vinyl ester resins based upon bisphenol-A. See, for example, U.S. Pat. No. 4,375,489. Unsaturated polyesters are closely related to vinyl esters, the principal difference being that unsaturated polyesters include reactive carbon-carbon double bonds within the backbone of the polymer chain (rather than solely at the termini). Typical examples of unsaturated polyester resins include resins based on isophthalic- and/or orthophthalic acid esters. Epoxy resins include reactive ethylene oxide moieties that function to link the individual monomers into a thermoset plastic. Typical examples of epoxy resins include styrenated epoxy vinyl ester resin and bisphenol-epoxy vinyl ester resin.

The preferred inorganic fillers for use in the present invention are minerals. The most preferred minerals are the Group IIA sulfates, namely: magnesium sulfate, calcium sulfate, strontium sulfate (celestine), and barium sulfate (baryte). Barium sulfate is preferred. Other inorganic fillers, such as crystalline silica, amorphous silica, mica, glass, ceramics, and the like, can also be used in the present invention. In terms of low-cost production, recycled glass is the preferred filler because of its ready availability, color selection, and cost. Suitable fillers are available commercially from numerous international suppliers, including S&B Industrial Minerals S.A. (Athens, Greece), S&B North America, Inc. (Brunswick, Ga., USA), and 20 Microns Limited (Baroda, India.)

Of critical importance to the present invention is the average particle size distribution of the inorganic component of the composite material. This is key both in terms of the functional performance of the cured composite, the sprayability of the uncured composite (if spray application is desired), and the appearance of the articles of manufacture fabricated from the composite material. Based on the overall weight of the composition, it is preferred that the first inorganic filler has an average particle size ranging from about 0.5 mm to about 3 mm; and the second inorganic filler has an average particle size ranging from about 0.03 mm to about 0.08 mm, and still more preferred that the first inorganic filler has an average particle size ranging from about 0.6 mm to about 2.5 mm; and the second inorganic filler has an average particle size ranging from about 0.04 mm to about 0.075 mm. If the product is to be applied using a sprayer, it is most preferred that the first inorganic filler be omitted entirely and that the composition comprise about 50 wt % of the second inorganic filler and about 50 wt % of the thermosetting resin.

The determination of average particle size can be accomplished by any means now known or developed in the future for determining average particle size. Suitable means for determining average particle size include mechanical screening, laser light-scattering, and Coulter-counting (a conventional and well known means of particle size determination that relies upon measuring the conductivity of a suspension of the particles in a conductive liquid.)

The composition may also include any number of accessory ingredients, such as colorants, aggregate (to add variegation and "depth" to the finished product), and the like. If aggregate is added to the composition, it is preferred that it be added in an amount no greater than about 30 wt % of the entire composition. Colorants, pigments, and the like, are normally added in only very small quantities, normally well under about 0.5 wt % of the entire composition.

The preferred method for making an article of manufacture using the inventive composition of matter is as follows. A polymerizable monomer that yields a thermoset polymer is mixed with the inorganic filler(s) and vigorously stirred. Any accessory ingredients are then added, again with vigorous agitation. It is preferred that the formulation than be vigorously mixed under reduced pressure, for example, in a vacuum bag. The pressure applied is preferably about 20 torr or less.

A catalyst capable of catalyzing polymerization of the monomer is then added to the mixture. Any number of suitable catalysts are known and widely available commercially. For vinyl-containing monomers, MEKP is the preferred catalyst. The catalyst is generally added in a very small amount, usually about 2 wt % or less. As is known in the art, the amount of catalyst required will depend upon the type of monomer chosen, the amount of monomer present in the mixture, the type of catalyst chosen, and the temperature at which the catalyst is added to the mixture, and the temperature of the mixture itself at the time the catalyst is added.

The mixture is again agitated thoroughly, under a pressure less than atmospheric pressure to yield a castable and/or sprayable composition of matter. The composition of matter is then shaped into any desirable form (e.g., by spraying, molding, extrusion, pultrusion, etc.). The shaped article is then cured by heating to a temperature of at least about 100° F. (37.8° C.) and preferably at least about 250° F. (121.1° C.). As noted earlier, the heating time will vary based on the mass and shape of the article. Generally, heating at 250° F. for about 2 hours is sufficient. The cured article can then be final finished, if desired, by any means known in the art.

What is claimed is:

1. A composite material comprising:
   from about 50 wt % to about 75 wt % (based on total weight of the composite material) of inorganic material, wherein the inorganic material comprises
   from about 30 wt % to about 50 wt % (based on weight of the inorganic material) of a first inorganic filler having an average particle size ranging from about 0.5 mm to about 5 mm; and
   from about 50 wt % to about 70 wt % (based on weight of the inorganic filler) of a second inorganic filler having an average particle size ranging from 0.02 mm to about 0.1 mm, and
   from about 25 wt % to about 50 wt % (based on total weight of the composite material) of a thermosetting polymeric resin.

2. The composite material of claim 1, wherein the first inorganic filler has an average particle size ranging from about 0.5 mm to about 3 mm; and the second inorganic filler has an average particle size ranging from about 0.03 mm to about 0.08 mm.

3. The composite material of claim 1, wherein the first inorganic filler has an average particle size ranging from about 0.6 mm to about 2.5 mm; and the second inorganic filler has an average particle size ranging from about 0.04 mm to about 0.075 mm.

4. The composite material of claim 1, wherein the thermosetting polymeric resin is selected from the group consisting of vinyl ester resins, unsaturated polyester resins, epoxy resins, and combinations thereof.

5. The composite material of claim 1, wherein the thermosetting polymeric resin is a vinyl ester resin.

6. The composite material of claim 1, wherein the first and second inorganic fillers comprises a mineral.

7. The composite material of claim 6, wherein the first and second inorganic fillers independently comprise a mineral selected from the group consisting of magnesium sulfate, calcium sulfate, strontium sulfate, barium sulfate, and combinations thereof.

8. The composite material of claim 6, wherein the first and second inorganic fillers comprises barium sulfate.

9. The composite material of claim 1, wherein the first and second inorganic fillers independently comprise a mineral selected from the group consisting of crystalline silica, amorphous silica, mica, glass, ceramics, magnesium sulfate, calcium sulfate, strontium sulfate, barium sulfate, and combinations thereof.

10. The composite material of claim 1, comprising from about 60 wt % to about 75 wt % (based on total weight of the composite material) of inorganic material, and from about 25 wt % to about 40 wt % (based on total weight of the composite material) of a thermosetting polymeric resin.

11. The composite material of claim 1, comprising from about 65 wt % to about 72 wt % (based on total weight of the composite material) of inorganic material, and from about 28 wt % to about 45 wt % (based on total weight of the composite material) of a thermosetting polymeric resin.

12. The composite material of claim 11, wherein the first inorganic filler has an average particle size ranging from about 0.5 mm to about 3 mm; and the second inorganic filler has an average particle size ranging from about 0.03 mm to about 0.08 mm.

13. The composite material of claim 11, wherein the first inorganic filler has an average particle size ranging from about 0.6 mm to about 2.5 mm; and the second inorganic filler has an average particle size ranging from about 0.04 mm to about 0.075 mm.

14. A composite material comprising:
   from about 40 wt % to about 60 wt % (based on total weight of the composite material) of inorganic material, wherein the inorganic material comprises
      from about 30 wt % to about 50 wt % (based on weight of the inorganic material) of a first inorganic filler having an average particle size ranging from about 0.5 mm to about 5 mm; and
      from about 50 wt % to about 70 wt % (based on weight of the inorganic filler) of a second inorganic filler having an average particle size ranging from 0.02 mm to about 0.1 mm, and
   from about 40 wt % to about 60 wt % (based on total weight of the composite material) of a thermosetting polymeric resin.

15. The composite material of claim 14, wherein the first inorganic filler has an average particle size ranging from about 0.5 mm to about 3 mm; and the second inorganic filler has an average particle size ranging from about 0.03 mm to about 0.08 mm.

16. The composite material of claim 14, wherein the first inorganic filler has an average particle size ranging from about 0.6 mm to about 2.5 mm; and the second inorganic filler has an average particle size ranging from about 0.04 mm to about 0.075 mm.

17. The composite material of claim 14, wherein the thermosetting polymeric resin is selected from the group consisting of vinyl ester resins, unsaturated polyester resins, epoxy resins, and combinations thereof.

18. The composite material of claim 14, wherein the thermosetting polymeric resin is a vinyl ester resin.

19. The composite material of claim 14, wherein the first and second inorganic fillers comprises a mineral.

20. The composite material of claim 19, wherein the first and second inorganic fillers independently comprise a mineral selected from the group consisting of magnesium sulfate, calcium sulfate, strontium sulfate, barium sulfate, and combinations thereof.

21. The composite material of claim 19, wherein the first and second inorganic fillers comprises barium sulfate.

22. The composite material of claim 14, wherein the first and second inorganic fillers independently comprise a mineral selected from the group consisting of crystalline silica, amorphous silica, mica, glass, ceramics, magnesium sulfate, calcium sulfate, strontium sulfate, barium sulfate, and combinations thereof.

* * * * *